US010218825B2

(12) United States Patent
Chefalas et al.

(10) Patent No.: US 10,218,825 B2
(45) Date of Patent: *Feb. 26, 2019

(54) ORCHESTRATING RESOURCES IN A MULTILAYER COMPUTING ENVIRONMENT BY SENDING AN ORCHESTRATION MESSAGE BETWEEN LAYERS

(71) Applicant: International Business Machines Corporation, Armonk, NY (US)

(72) Inventors: Thomas E. Chefalas, Somers, NY (US); David M. Egle, Rochester, MN (US); Daniel L. Hiebert, Pine Island, MN (US); Dennis D. Jurgensen, Chapel Hill, NC (US); Arthur J. Meyer, III, Rochester, MN (US); David M. Schultz, Williston, VT (US); Peter A. Singh, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/800,509

(22) Filed: Nov. 1, 2017

(65) Prior Publication Data
US 2018/0054500 A1 Feb. 22, 2018

Related U.S. Application Data

(63) Continuation of application No. 14/739,032, filed on Jun. 15, 2015, now Pat. No. 9,888,098.

(51) Int. Cl.
*G06F 15/16* (2006.01)
*H04L 29/08* (2006.01)
(Continued)

(52) U.S. Cl.
CPC ............ *H04L 69/30* (2013.01); *G06F 9/5072* (2013.01); *H04L 67/10* (2013.01); *G06F 2009/4557* (2013.01)

(58) Field of Classification Search
CPC . H04L 67/10; G06F 2009/4557; G06F 9/5072
See application file for complete search history.

(56) References Cited

U.S. PATENT DOCUMENTS 6,073,180 A 6/2000 Onoda et al.
8,689,282 B1 4/2014 Oprea et al.
(Continued)

OTHER PUBLICATIONS

IBM, "List of IBM Patents or Patent Applications Treated as Related", Appendix P, 2 pages, dated Nov. 1, 2017.
(Continued)

*Primary Examiner* — Hieu T Hoang
(74) *Attorney, Agent, or Firm* — William H. Hartwell

(57) ABSTRACT

Software that generates a message containing operations for multiple layers in a multi-layer environment, by performing the following operations: (i) receiving an operation to perform across a multilayer computing environment; (ii) generating a message for performing the operation across the multilayer computing environment, wherein the message includes a plurality of layer portions that include sub-operation(s) of the operation, wherein each layer portion corresponds to a respective layer in the multilayer computing environment; and (iii) orchestrating performance of the operation by sending the message between layers in the multilayer computing environment according to a sequence for performing sub-operation(s) indicated in the message, wherein when the message is located at a respective layer, the layer performs a respective set of sub-operation(s) according to the respectively corresponding layer portion for the layer in the message.

18 Claims, 16 Drawing Sheets

(51) Int. Cl.
*G06F 9/50* (2006.01)
*G06F 9/455* (2018.01)

(56) References Cited

U.S. PATENT DOCUMENTS

| | | |
|---|---|---|
| 8,843,633 B2 | 9/2014 | Eriksson et al. |
| 8,972,725 B2 | 3/2015 | Arun et al. |
| 9,917,729 B2 | 3/2018 | McMurry et al. |
| 2008/0288624 A1 | 11/2008 | Armangil |
| 2011/0321033 A1 | 12/2011 | Kelkar et al. |
| 2012/0246317 A1 | 9/2012 | Eriksson et al. |
| 2013/0198740 A1 | 8/2013 | Arroyo et al. |
| 2013/0297685 A1* | 11/2013 | McGrath ............... G06F 9/541 709/204 |
| 2013/0332927 A1* | 12/2013 | Tang ............... G06F 9/45545 718/1 |
| 2014/0075239 A1 | 3/2014 | Prathipati et al. |
| 2014/0280437 A1 | 9/2014 | Eder |
| 2014/0337517 A1* | 11/2014 | Naseh ............... H04L 41/0803 709/224 |
| 2015/0052218 A1 | 2/2015 | Zhang et al. |
| 2016/0044035 A1 | 2/2016 | Huang |
| 2016/0098250 A1 | 4/2016 | Gross et al. |
| 2016/0197850 A1 | 7/2016 | Peng et al. |
| 2016/0366252 A1 | 12/2016 | Chefalas et al. |

OTHER PUBLICATIONS

Kousiouris et al., "Translation of Application-level Terms to Resource-level attributes across the Cloud Stack Layers", Computers and Communications (ISCC), 2011 IEEE Symposium, Jun. 28-Jul. 1, 2011, pp. 153-160.

Mell, P. et al., "The NIST Definition of Cloud Computing", Recommendations of the National Institute of Standards and Technology, U.S. Department of Commerce, Special Publication 800-145, seven pages, Sep. 2011, Gaithersburg, MD.

* cited by examiner

ORCHESTRATING RESOURCES IN A MULTILAYER COMPUTING ENVIRONMENT BY SENDING AN ORCHESTRATION MESSAGE BETWEEN LAYERS

BACKGROUND

The present invention relates generally to the field of multilayer computing, and more particularly to orchestrating resources between layers in a multilayer computing environment.

Cloud computing is known. Cloud computing is the delivery of computing as a service rather than a product, whereby shared resources, software, and information are provided to computers and other devices as a utility over a network (typically the Internet). Cloud computing environments typically deliver resources over a plurality of abstraction layers where each layer is customized to deliver a specific set of functionality and implementation details for that functionality are hidden from the other layers (or "levels"). One known cloud computing task is orchestration, which involves the automatic arranging, coordinating, and/or managing of resources across abstraction levels in a cloud computing environment.

One problem in the cloud computing field (or, more broadly, in the field of multilayer computing environments) is the difficulty in orchestrating operations to be performed on individual layers of a multi-layer application stack. This is due, at least in part, to the fact that the amount of information passed between layers is limited, with many implementation details hidden from different layers. Some existing solutions utilize applications and/or services that traverse the layers of a multi-layer stack in order to gather information from and perform operations on each layer; however, these solutions are inefficient and typically involve a high amount of resource overhead.

U.S. Pat. No. 8,843,633 ("CLOUD-BASED RESOURCE IDENTIFICATION AND ALLOCATION", hereinafter "Eriksson") discloses a system, a method, and computer readable media for identifying resources to implement a service in a cloud computing environment. As indicated in the Abstract, Eriksson "analyze[s] a cloud's ability to support a desired service while maintaining separation between the cloud's logical layers." Furthermore, "given a list of resources need to implement a target service, a hierarchical plan may be generated. The plan may then be used by each layer to track and record the availability of various possible layer-specific resource selections."

Non-Patent Literature Kousiouris et al. ("TRANSLATION OF APPLICATION-LEVEL TERMS TO RESOURCE LEVEL ATTRIBUTES ACROSS THE CLOUD STACK LAYERS", hereinafter "Kousiouris") discloses "a multi-layer ecosystem" where "the exchange of information between the entities located in different layers is difficult for technical and business reasons." Kousiouris proposes "a generic approach . . . based on Artificial Neural Networks (ANNs)," applying ANNs "in order to solve this problem, through directly converting the application specific SLA terms to resource attributes."

SUMMARY

According to an embodiment of the present invention, there is a method, computer program product and/or system that performs the following operations (not necessarily in the following order): (i) receiving an operation to perform across a multilayer cloud computing environment, wherein the multilayer cloud computing environment includes an application layer, a platform layer, and an infrastructure layer; (ii) generating a message for performing the operation across the multilayer cloud computing environment, wherein the message includes a plurality of layer portions that include sub-operation(s) of the operation, wherein each layer portion corresponds to a respective layer in the multilayer cloud computing environment, and wherein at least a first layer portion corresponding to a first layer in the multilayer cloud computing environment is nested within a second layer portion corresponding to a second layer in the multilayer cloud computing environment; and (iii) orchestrating performance of the operation by sending the message between layers in the multilayer cloud computing environment according to a sequence for performing sub-operation(s) indicated in the message, wherein when the message is located at a respective layer, the layer performs a respective set of sub-operation(s) according to the respectively corresponding layer portion for the layer in the message. According to a preferred embodiment of the present invention, the multilayer computing environment is a cloud computing environment, advantageously allowing for the orchestration of operations across multiple sites and geographies.

According to another preferred embodiment of the present invention, each layer portion of the message is modifiable by the layer portion's respectively corresponding layer in the multilayer computing environment. Additionally, at least one layer in the multilayer computing environment modifies its respectively corresponding layer portion by appending the results of the performance of the layer's respective set of sub-operation(s) to the layer portion. This embodiment advantageously allows each layer in a multilayer computer environment to modify the message in a segmented way.

DETAILED DESCRIPTION

Figure 1:
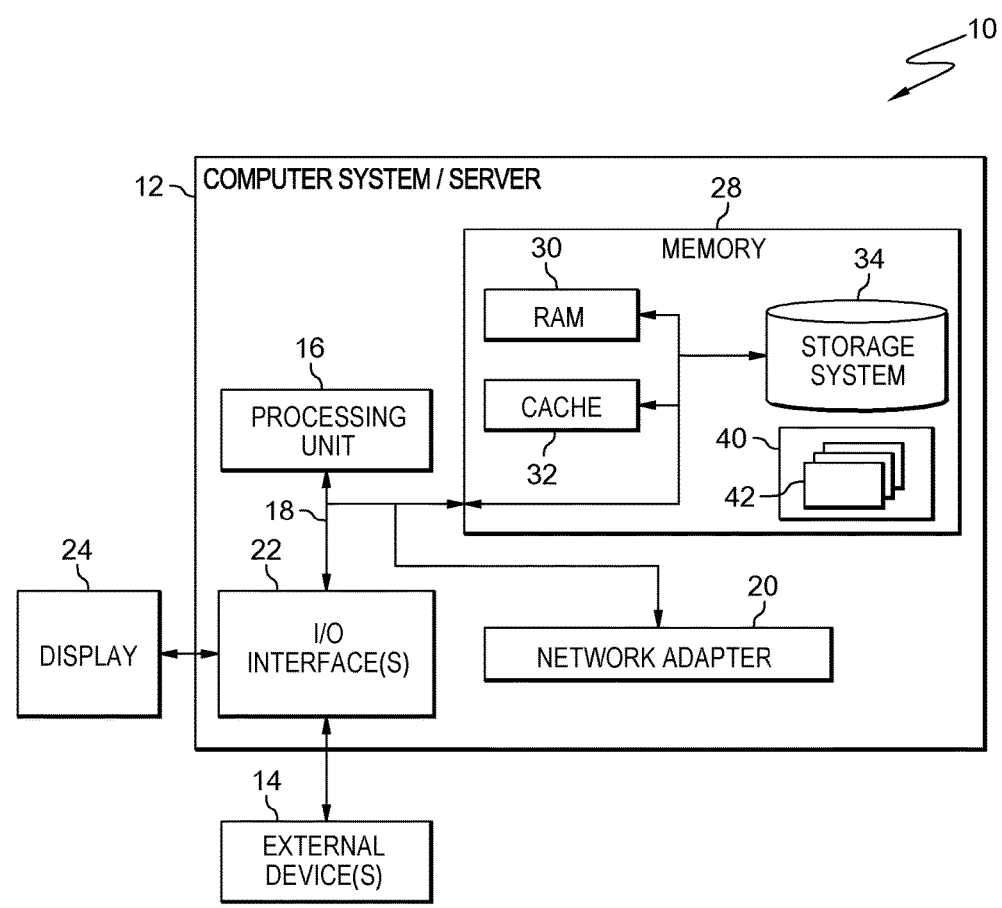
FIG. 1 depicts a cloud computing node used in a first embodiment of a system according to the present invention.

In typical multilayer computing environments, orchestration is performed from a centralized service or point of control which directs each component in each layer of the respective environment. Embodiments of the present invention generate a message containing program instructions for each layer in a multi-layer environment. The message includes an entire orchestration plan, and is passed between layers that execute their respective instructions to carry out the operation(s) included in the orchestration plan. In some embodiments, the layers modify portions of the message, depending on various results and error conditions. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
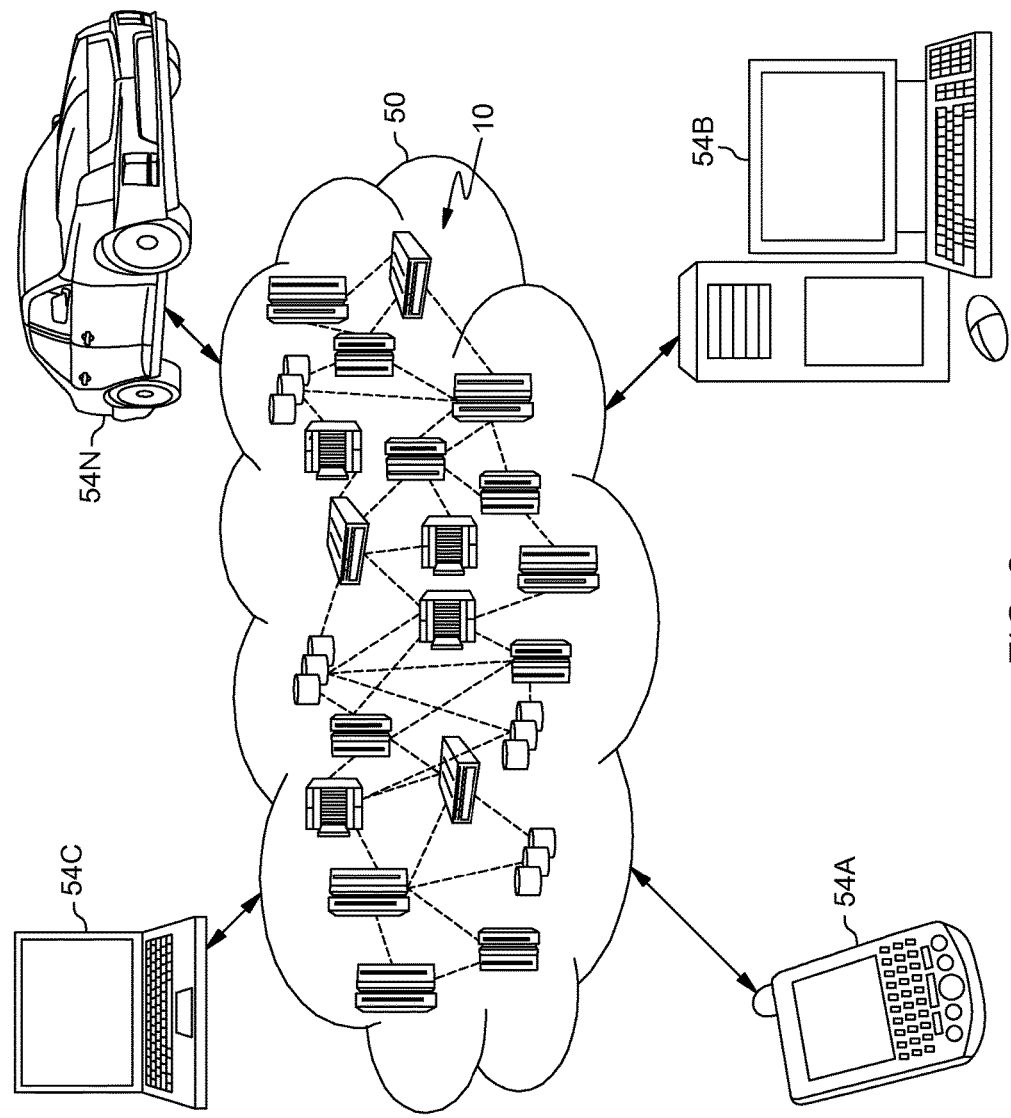
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
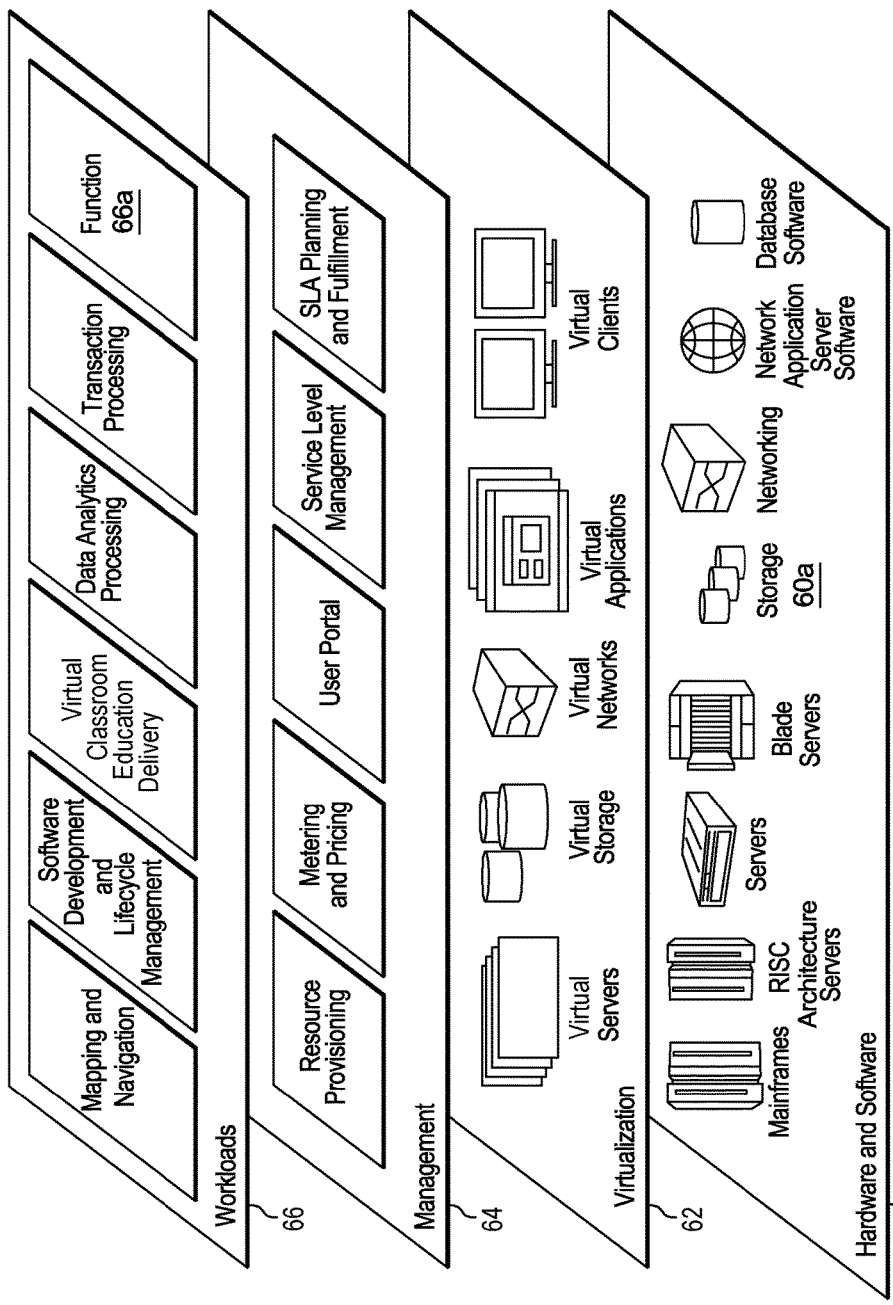
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
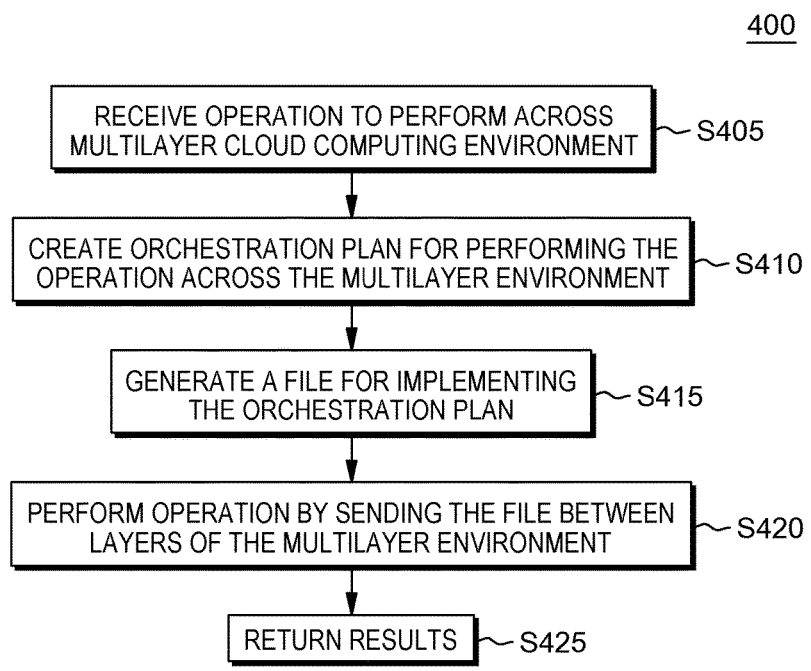
FIG. 4 is a flowchart showing a first embodiment method performed, at least in part, by the first embodiment system.
Figure 5:
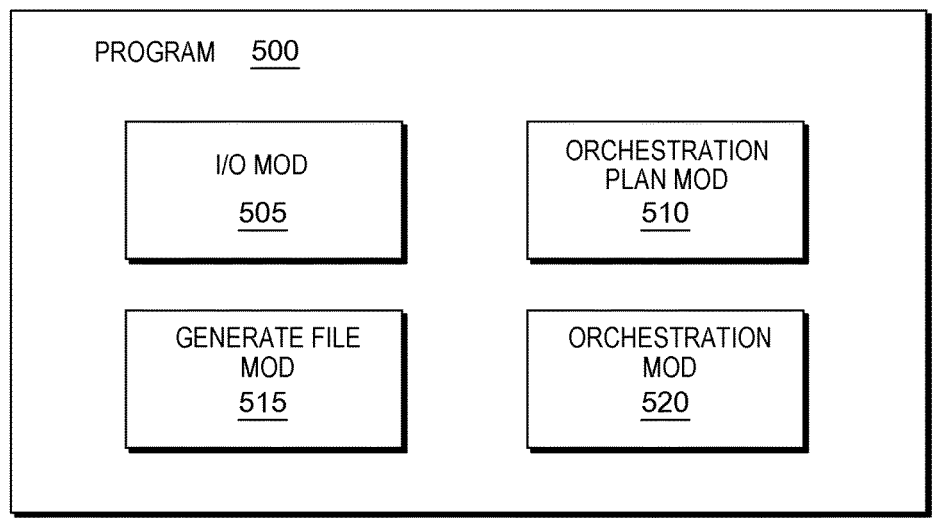
FIG. 5 is a block diagram showing a machine logic (for example, software) portion of the first embodiment system.

FIG. 4 shows flowchart 400 depicting a method according to the present invention. FIG. 5 shows program 500 for performing at least some of the method operations of flowchart 400. This method and associated software will now be discussed, over the course of the following paragraphs, with extensive reference to FIG. 4 (for the method operation blocks) and FIG. 5 (for the software blocks). One physical location where program 500 of FIG. 5 may be stored is in storage block 60a (see FIG. 3). It should be noted that this example embodiment (also referred to in this sub-section as the "present embodiment," the "present example," the "present example embodiment," and the like) is used herein for example purposes, in order to help depict the scope of the present invention. As such, other embodiments (such as embodiments discussed in the Further Comments and/or Embodiments sub-section, below) may be configured in different ways or refer to other features, advantages, and/or characteristics not fully discussed in this sub-section.

Processing begins at operation S405, where input/output (I/O) module ("mod") 505 receives an operation to perform across a multilayer cloud computing environment. The operation may be any known (or yet to be known) operation able to be performed across a computing environment (for a definition of "operation", see the Definitions sub-section of this Detailed Description). In many embodiments, performance of the operation requires the involvement of at least two abstraction layers included in the multilayer environment. That is, in these embodiments, in order to perform the operation, various sub-operations (to be discussed in further detail, below) must be performed by different layers in the environment. The environment may be any known (or yet to be known) computing environment that includes at least two abstraction layers. For a discussion of abstraction layers in the context of cloud computing, see: (i) the Background section; and (ii) the Hardware and Software Environment sub-section of this Detailed Description section, above. It should be noted, however, that although the present example relates to a cloud computing environment (specifically, cloud computing environment 50, see FIG. 2), in other embodiments the environment may not necessarily be limited to a cloud environment or an environment implemented using cloud technology.

In the present example embodiment, the operation received by I/O mod 505 in operation S405 is a request from a user to install a piece of software (referred to herein as Program A) on the various computers in the multilayer cloud computing environment (that is, cloud computing environment 50, depicted in FIG. 2). In this embodiment, the "layers" of the multilayer environment are the abstraction layers depicted in FIG. 3—namely, hardware and software layer 60, virtualization layer 62, management layer 64, and workloads layer 66. Alternatively, in another embodiment, the layers include one or more layers corresponding to the service models discussed in the previous sub-section: (i) an application layer (corresponding to the SaaS service model); (ii) a platform layer (corresponding to the PaaS service model); and/or (iii) an infrastructure layer (corresponding to the IaaS service model).

Processing proceeds to operation S410, where orchestration plan mod 510 creates an orchestration plan for performing the operation across the multilayer cloud computing environment. The orchestration plan may include any known (or yet to be known) instructions for performing the operation, including, for example, instructions for arranging, coordinating, and/or managing resources across the abstraction layers in the cloud computing environment. In many embodiments, the orchestration plan includes a set of sub-operations for performing the operation across the various layers of the multilayer environment. For example, in some embodiments, the orchestration plan includes: (i) sub-operations to be performed by each layer (including corresponding instruction for performing those sub-operations); and (ii) information indicating an order by which the layers are to perform the instructions. In the present example embodiment, the orchestration plan includes instructions for installing components of Program A at each of the four abstraction levels and information indicating that the components are to be installed at the highest layer (that is, hardware and software layer 60) first, followed by the virtualization layer 62, then management layer 64, and, finally, workloads layer 66.

Processing proceeds to operation S415, where generate file mod 515 generates a file (also sometimes referred to as a "message" or a "payload") for implementing the orchestration plan across the multilayer cloud computing environment. A purpose of the file, which will be explained in more detail, below, is to be sent (or passed) between layers of the multilayer environment, with each layer performing its respective sub-operations as indicated in the orchestration plan. In certain embodiments, the file includes a plurality of layer portions, where each layer portion corresponds to a respective layer in the multilayer computing environment and includes computer program instructions for performing the set of sub-operations indicated in the orchestration plan. Furthermore, in many embodiments, the file includes information indicating an order for performing the sub-operations (including an order of layers and/or an order of sub-operations within a specific layer). In the present example embodiment, the generated file includes four layer portions—one for each of the layers in the multilayer environment. Each layer portion includes: (i) a header portion indicating where the file is to be sent after its respective layer completes its sub-operations; and (ii) computer program instructions to be performed by the respective layer. However, in other embodiments, the generated file is organized in other ways. For some examples of additional file (or "message" or "payload") configurations, including example program instructions included in such a file, see the Further Comments and/or Embodiments sub-section of this Detailed Description. Furthermore, it should be recognized that in certain embodiments, the "file" discussed herein is not necessarily stored in a file system (such as storage system 34). In many cases, the file is a string (for example, a JSON string) which, although capable of being stored in a file format, exists only (or partially) in computer memory.

In certain embodiments, the file generated by mod 515 follows a composite design pattern, where a first layer portion corresponding to a first layer is nested within a second layer portion corresponding to a second layer. In these embodiments, when the file is sent to the second layer, the second layer will identify that the first layer's instructions need to be completed prior to completing the second layer's instructions, and the second layer will send the file to the first layer for completion of the first layer's instructions. For examples of files with composite design patterns, see the Further Comments and/or Embodiments sub-section of this Detailed Description (specifically, the discussion of the file shown in FIGS. 6A and 6B and the discussion of the file shown in FIGS. 8A-8I).

Processing proceeds to operation S420, where orchestration mod 520 performs the operation by sending the file between layers of the multilayer cloud computing environment (thereby orchestrating the sub-operations required to perform the operation). As stated above, when the file is located at a particular layer, that layer performs its respective set of sub-operations according to the computer program instructions included in the layer's respectively corresponding layer portion of the file. Furthermore, in some embodiments (including the present example embodiment), the instructions for sending the file from layer-to-layer in the multilayer cloud computing environment are included directly in the file (for example, in a header portion). As a result, the file is sent throughout the layers of the multilayer environment until all of its respective sub-operations (and thus, the entire operation) have been completed.

It should be noted that in some embodiments, each layer of the multilayer environment will perform sub-operations according to instructions in a corresponding layer portion. However, in other embodiments, only some layers will need to perform sub-operations. In many of these embodiments, the non-performing layers will simply act as conduits for the file, sending the file along until it reaches a layer that will be performing sub-operations. In one embodiment, for example, the multilayer environment includes hundreds of abstraction layers, while only two of those layers have a corresponding layer portion with instructions for performing sub-operations. In another embodiment, however, a multilayer environment with hundreds of abstractions layers includes layer portions (with corresponding instructions for performing sub-operations) for each and every abstraction layer. As such, it should be recognized that the number of layer portions in the file will not always directly correspond to the number of layers in the multilayer environment, and that in many cases the layer portions will only correspond to a subset of the entire set of layers.

In certain embodiments, at least one layer in the multilayer computing environment modifies its respectively corresponding layer portion by appending the results of the performance of the layer's respective set of sub-operation(s) to the layer portion. Stated another way, in these embodiments, a layer may modify the file (specifically, the layer's respectively corresponding layer portion) to reflect the results of the layer's sub-operations. In the present embodiment, for example, each layer, upon completing its sub-operations, modifies its layer portion to indicate whether the layer's respective installation tasks have been completed successfully (that is, without any errors). If errors were present in the performance of the sub-operations, the layer will indicate as such in the file. As a result, when operation S520 completes after each layer has performed its sub-operations, a quick review of the file will indicate whether the installation was successfully performed or whether there were errors. For additional examples of ways that layers can modify the file (or "message" or "payload"), see the Further Comments and/or Embodiments sub-section of this Detailed Description.

Processing proceeds to operation S425, where I/O mod 505 returns the results of the performance of the operation. In many embodiments (including the present example embodiment) the "results" of the performance are indicated directly in the file (as the file was modified by each layer in order to include its respective results). In these embodiments, the file is parsed in order to determine the complete results, and the complete results are then passed on to the entity that the operation was originally received from (in the case of the present example embodiment—the user).

III. Further Comments and/or Embodiments

Some embodiments of the present invention may include one, or more, of the following features, characteristics and/or advantages: (i) orchestrating operations to be performed on individual layers of a multi-layer application stack; (ii) creating a common protocol for delivering a payload between layers of a multi-layer application stack; (iii) orchestrating operations across multiple sites and geographies; (iv) simplification over existing methods; (v) additional code reuse due to the use of a common parser; and/or (vi) utilizing a common message structure that is transmitted between components.

Certain embodiments of the present invention include a well-formed message that is passed in its entirety across an application stack. The message format describes the operations to be performed at different layers of the stack, input for those operations, and routing information to direct which layers in the application stack should perform those operations. As the message is received by each layer in the stack, only the sections pertaining to that layer are used to perform the operation. The information in each particular section will also direct its corresponding layer where to send the message next on the application stack. The message is also augmentable by each layer in the application stack to include further input (to be used by a subsequent operation) and results of the operation performed.

Figure 6A:
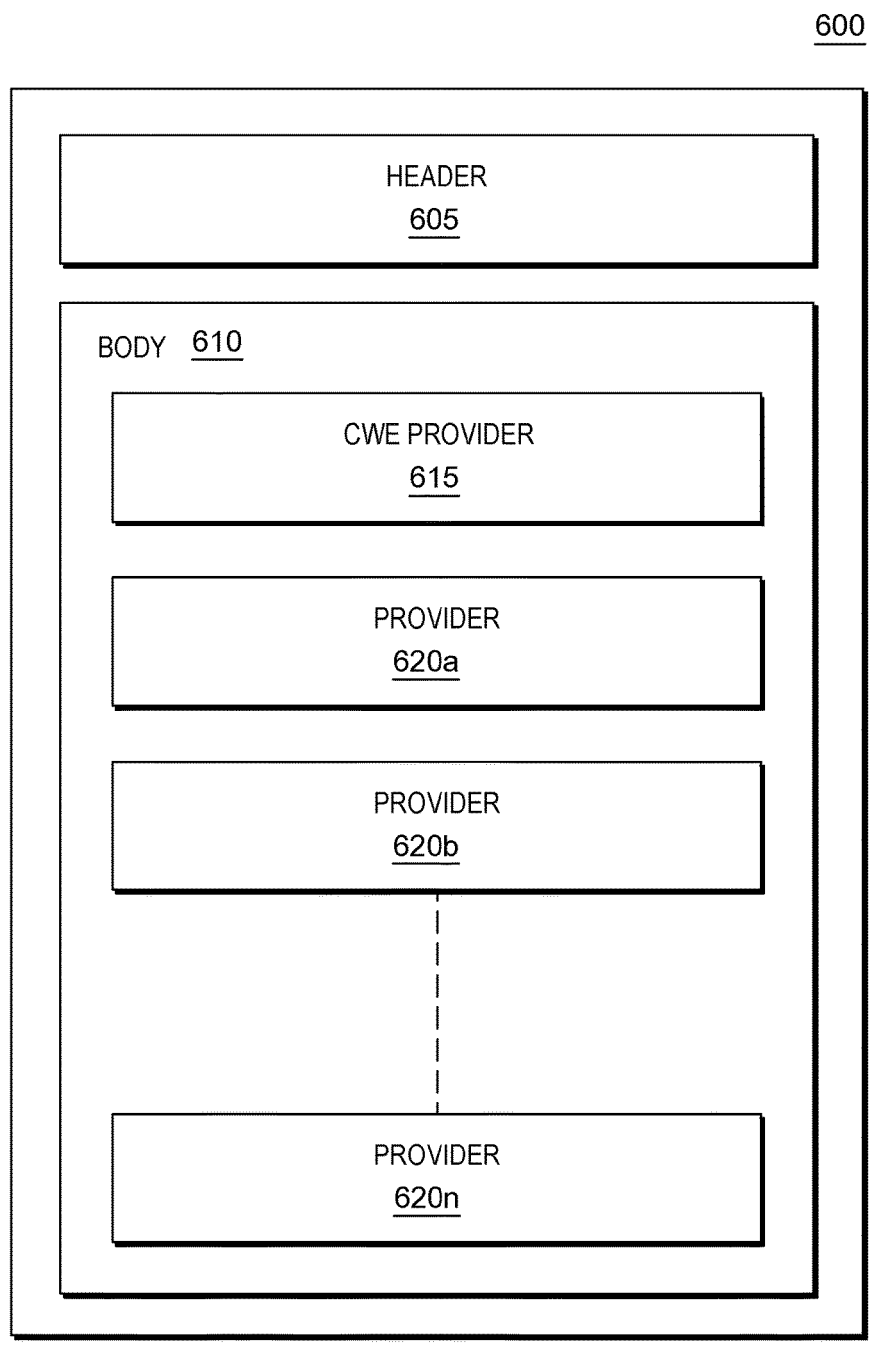
FIG. 6A is a diagram showing the structure of a message according to a second embodiment of a cloud computing environment (also called the "second embodiment system") according to the present invention.

In certain embodiments, a message (also sometimes referred to as a "payload") includes a plurality of sub-sections (also sometimes referred to as "providers" and/or "layer portions"). Each provider corresponds to a layer on the application stack. FIG. 6A is a diagram of the structure of message 600 according to a second embodiment system. As shown in FIG. 6A, message 600 includes header 605 and body 610, where body 610 includes cloud workflow engine (CWE) provider 615, provider 620a, provider 620b, and provider 620n. In the second embodiment system, header 605 is consumed by a central service mediator of a cloud computing environment, and providers 615, 620a, 620b, and 620n are consumed by a site service mediator of the cloud computing environment. Providers 615, 620a, 620b, and 620n are each used to invoke a CWE process and return results that are ultimately sent back to the central service mediator.

Figure 6B:
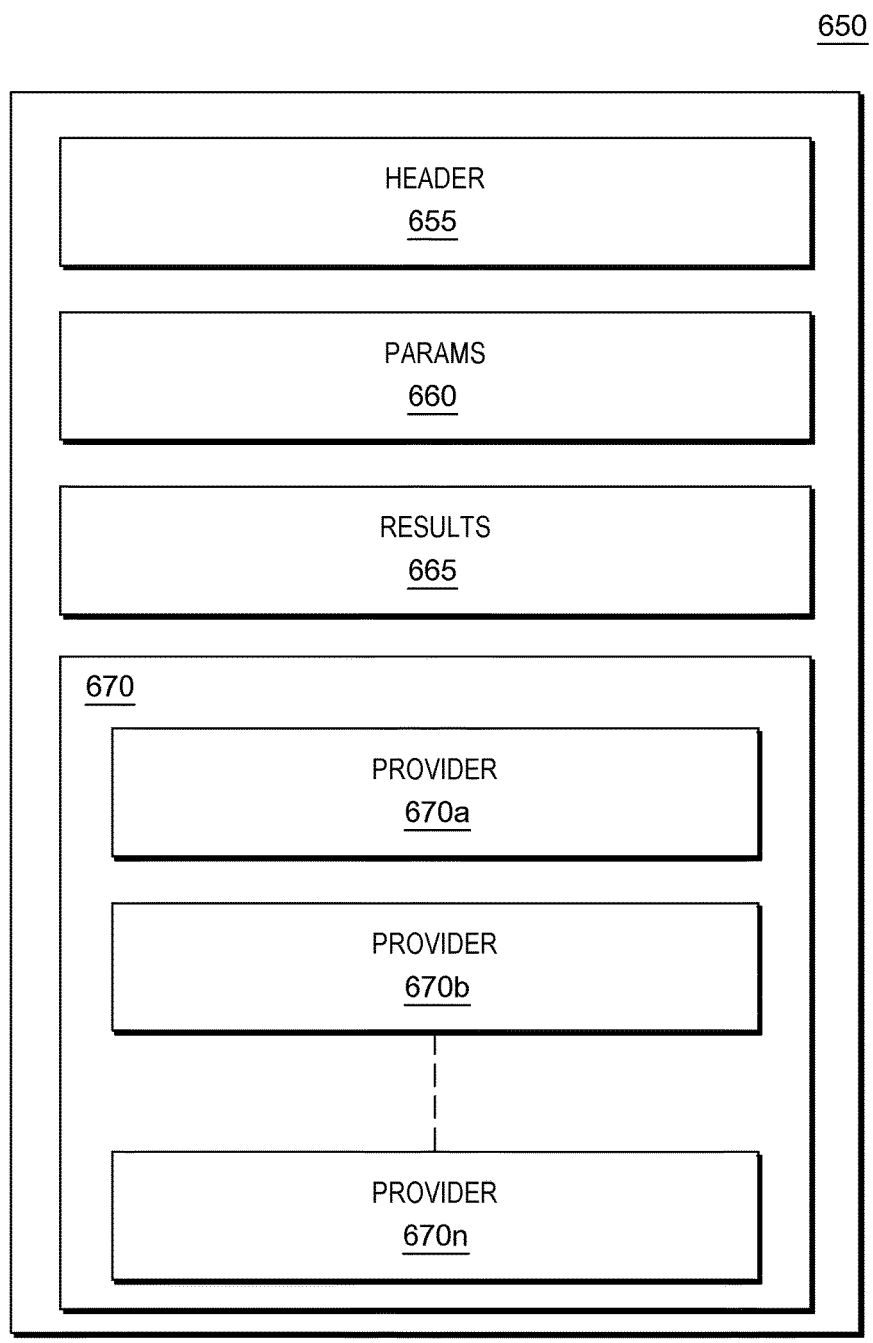
FIG. 6B is a diagram showing the structure of a provider portion of a message according to the second embodiment system.

Providers 615, 620a, 620b, and 620n each include corresponding subsections. FIG. 6B is a diagram of the structure of one of these providers (denoted provider 650). As shown in FIG. 6B, provider 650 includes header 655, input parameters ("params") 660, results 665, and nested list of sub-providers 670 (including providers 670a, 670b, and 670n). In the second embodiment system, header 655 identifies provider 650 for a server (using fields such as "type" and "name"), and includes credentials for a REST call that services consuming provider 650 (that is, services at a particular layer) would make (such as "REST url", "username", and "password"). Params 660 are input parameters used for those services. Results 665 include the final state of the provider (for example, "ERROR" or "SUCCESS") and any output properties that need to be returned to the central service or another service in the stack. Sub-providers 670 (also referred to as "child providers") each have the same model as provider 650 (also referred to as the "parent provider"), and are used when the service that consumes the parent provider needs to call other services.

Referring still to the second embodiment system, as message 600 is passed across the layers in the application stack, only the provider section (such as provider 650) corresponding to the current layer is consumed to drive the operation at that layer. The layer searches through the message using information in the header (such as header 655) of each provider (such as provider 650) to identify the provider it will use. If the operation requires communication with a server, location and credentials for the server are located in a header section (such as header 655). A param sub-section (such as params 660) is used as input to driver the layer's operation, and a results sub-section (such as results 665) is augmented by the layer to document the results of the operation. An optional providers sub-section (such as sub-providers 670) is used to drive further operations that are related to the parent provider (such as provider 650). To avoid data duplication in a message, an operation can use information in a sub-provider or any of a sub-provider's direct ancestors.

Referring still to the second embodiment system, generally speaking, the flow of a message begins at the topmost layer in the application stack, where input from a user or other application is used to create a message describing the overall operation to be performed. The message is then passed to an initial orchestration layer which uses a specific provider (such as CWE provider 615) to begin the processing of the operation. As the layer performs its operation it may pass the message to another layer for further operations. The message is passed in its entirety, but the identification of which layer in the application to pass the message to may be described in the provider section being used or be left up to the implementation of the present layer. When the operation is completed at a layer, the message is augmented to add results and then passed back to the layer that called it. When all the operations are completed, the message returns back at the top most layer, augmented to include the results of all operations performed by layers of the application stack.

Figure 7:
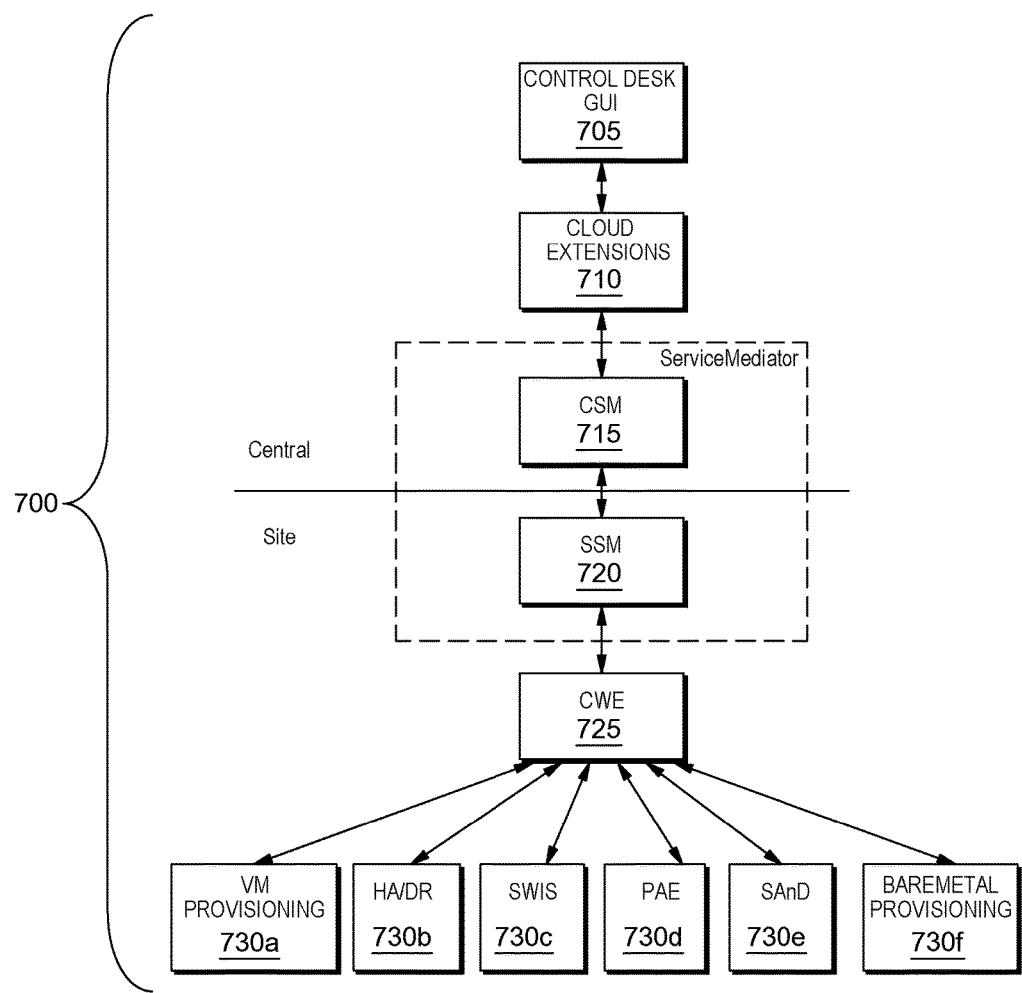
FIG. 7 depicts components of the second embodiment system (a cloud computing environment) according to the present invention.

FIG. 7 depicts components of the second embodiment system. As shown in FIG. 7, system 700 includes Control Desk GUI 705, Cloud Extensions 710, and Central Service Mediator ("CSM") 715, all located at a central location in a cloud computing environment. System 700 also includes, Site Service Mediator ("SSM") 720, Cloud Workflow Engine ("CWE") 725, VM Provisioning 730a, High Availability Disaster Recovery Orchestrator ("HA/DR") 730b, Software Installation Service ("SWIS") 730c, Patch Automation Engine ("PAE") 730d, Service Activation and Deactivation ("SAnD") server 730e, and Baremetal Provisioning 730f, which are all located at a site location in the cloud computing environment. Also, as shown in FIG. 7, CSM 715 and SSM 720 represent the central location and the site location, respectively, in a ServiceMediator sub-system. In this embodiment, Control Desk GUI 705 issues a request in XML format to Cloud Extensions 710. Cloud Extensions 710 builds a JSON payload (such as message 600) from the request and sends it to CSM 715. CSM 715 then reads the payload header (such as header 605) and uses the information in the header to route the payload to SSM 720. SSM 720 then uses CWE 725 (see, for example, CWE Provider 615) to look up the appropriate API (such as a BPM REST API) to call. To do this, CWE 725 looks at its specific input parameters (such as params 660) and, if necessary, any specific sub-processes (see, for example, sub-processes 670) for further REST APIs to call (such as those for VM Provisioning 730*a*, HA/DR 730*b*, SWIS 730*c*, PAE 730*d*, SAnD 730*e*, and Baremetal Provisioning 7300. Once CWE 725 determines its results, it adds the results to its results portion of the payload (such as results 665) after each of the results for its corresponding sub-processes are added to their respective results portions. CWE 725 then sends the payload to SSM 720, which looks at the results portion for CWE 725 to determine its own results. SSM 720 then adds its results to its corresponding results portion and sends the payload to CSM 715, which looks at the payload and reports its status to Cloud Extensions 710.

Referring still to FIG. 7, an example of a JSON payload (or "message") built by Cloud Extensions 710 is as follows:
Example Payload

```
{
    "providers": [
        {
            "type": "<Provider Type>",
            "name": "<Provider Name>",
            "action": "<Provider Action>",
            "uuid": "<Provider Universal Unique Identifier>",
            "enabled": "<true or false to indicate if service is enabled>",
            "url": "<Provider URL>",
            "username": "<Provider User>",
            "password": "<Provider Password>",
            "param": {
                "serializerType":
                "<fully.qualified.java.path.of.param.Class",
                "<parameter_specific_property1>": <param property1
                value>,
                "<parameter_specific_property2>": <param property2
                value>,
                ...
                "<parameter_specific_propertyN>": <param propertyN
                value>,
            },
            "result": {
                "type": "<ResultType>",
                "timestamp": "<timestamp>",
                "code": "<code>",
                "message": "<message>",
                "details": {
                    "serializerType":
                    "<fully.qualified.java.path.of.details.Class",
                    "<details_specific_property1>": <details property1 value>,
                    "<details_specific_property2>": <details property2 value>,
                    ...
                    "<details_specific_propertyN>": <details propertyN
                    value>,
                }
            }
            "providers": [
                <Array of children Providers, which can also have their own
                children>
            ],
        },
        {
            // Additional Providers as Needed
        }
    ]
}
```

FIGS. 8A-8I are diagrams showing components of a third embodiment system according to the present invention. In this embodiment, a payload (or "message") according to the present invention is used to gather evidence for performing a compliance check of a virtual machine (VM) deployment. This is advantageous over traditional methods for gathering evidence, as the message itself can gather evidence at each level of the deployment instead of having to rely on a compliance service to perform a verification.

In the third embodiment system, the payload includes provider sections for each application layer in a cloud computing environment. Each application layer uses its corresponding provider section to perform various operations (for example, operating system installations, software installations, software configuration, and/or recovery) and augment the message to include the results of these operations. As a result, the final message serves as an audit trail that can be used as evidence in a compliance check.

Figure 8A:
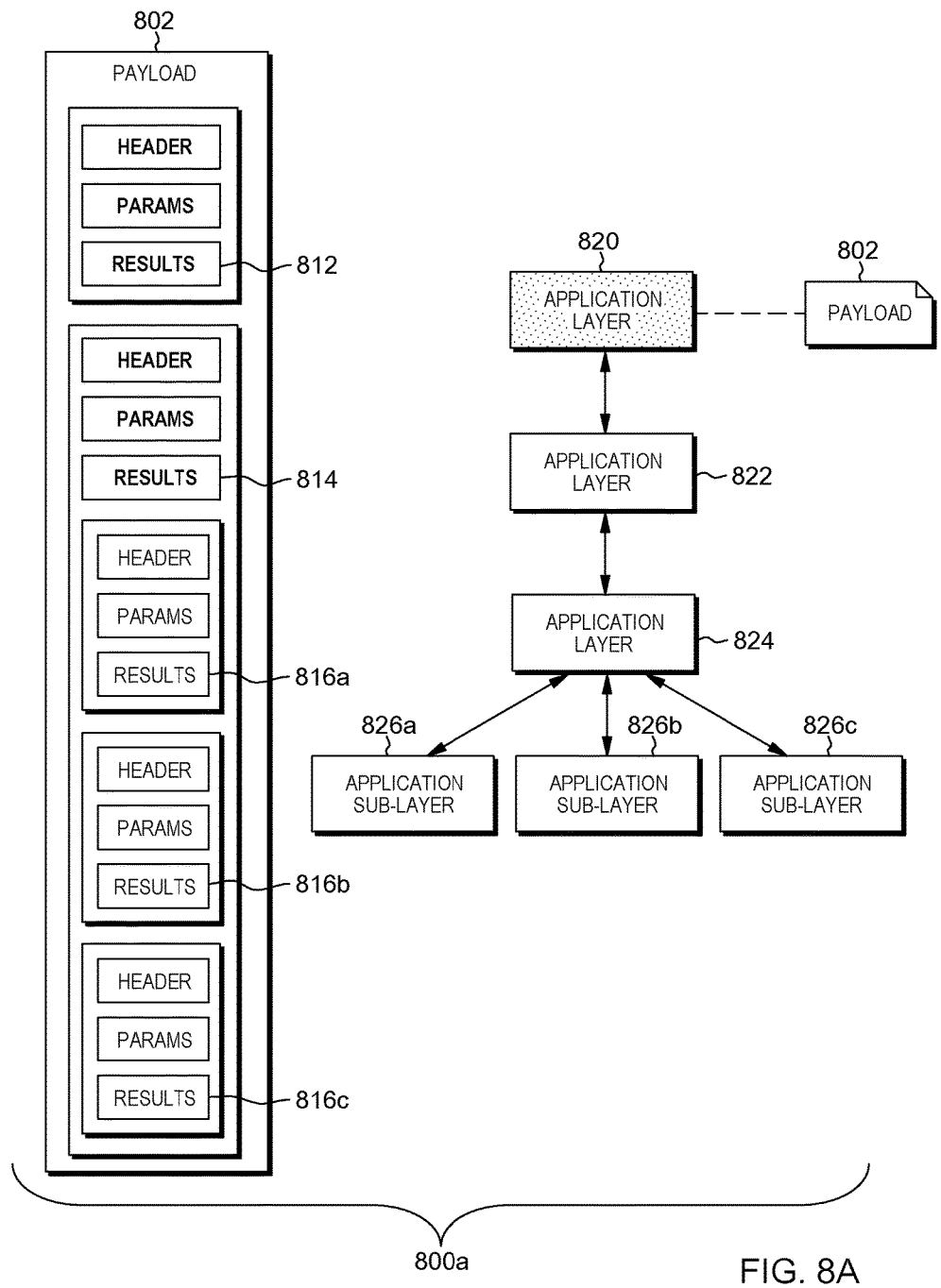
FIG. 8A is a diagram showing components of a third embodiment of a cloud computing environment (also called the "third embodiment system") according to the present invention, where a payload is located at a first application layer.
Figure 8B:
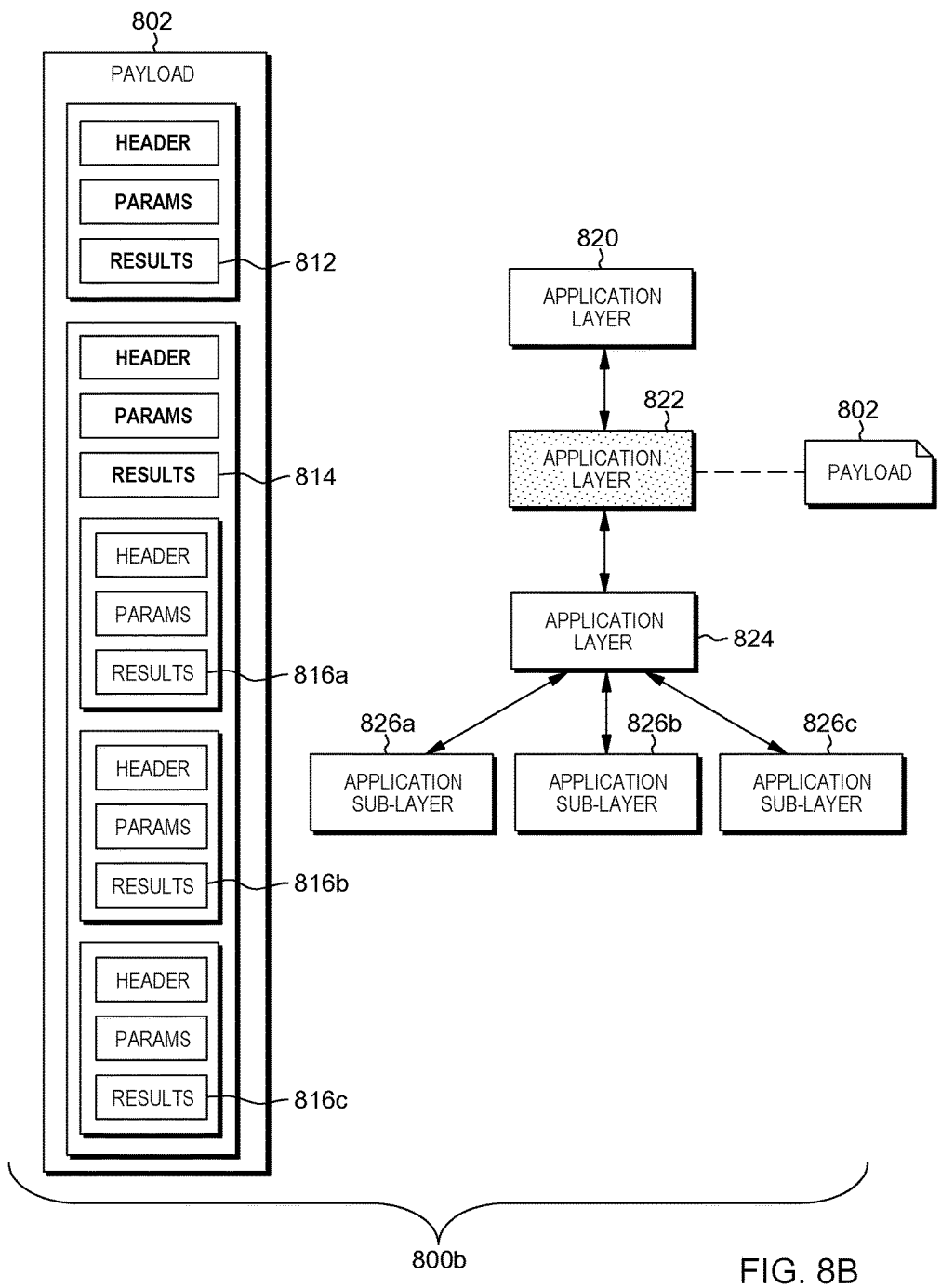
FIG. 8B is a diagram showing components of the third embodiment system, where the payload is located at a second application layer.
Figure 8C:
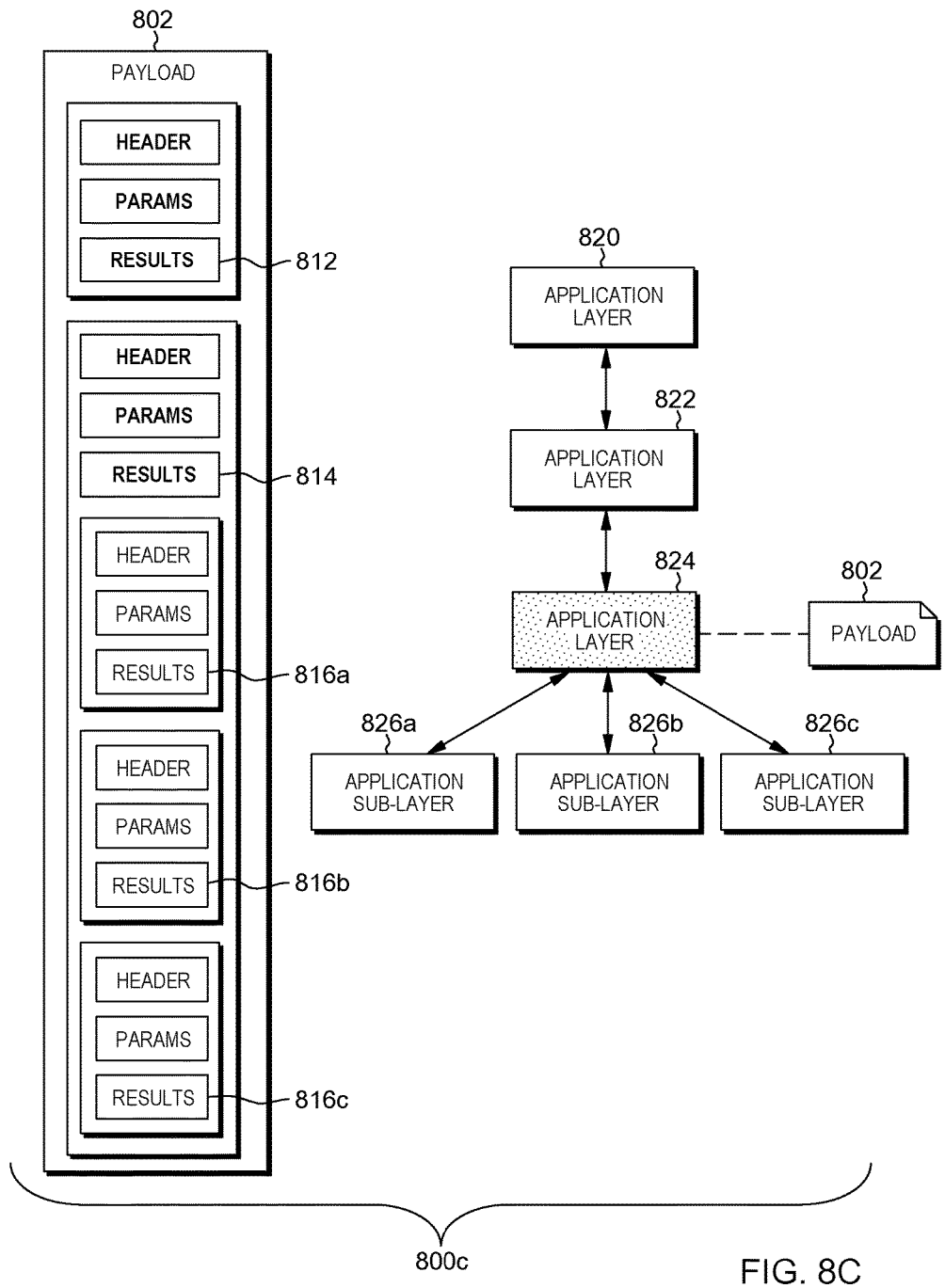
FIG. 8C is a diagram showing components of the third embodiment system, where the payload is located at a third application layer.

Payload 802 is created by application layer 820, as depicted in diagram 800*a* (see FIG. 8A). As shown in diagram 800*a*, payload 802 includes a plurality of provider sections, each of which includes a corresponding results portion (see results portions 812, 814, 816*a*, 816*b*, and 816*c*). In addition to application layer 820, the third embodiment system also includes application layer 822, application layer 824, application sub-layer 826*a*, application sub-layer 826*b*, and application sub-layer 826*c*. Once layer 820 creates payload 802, it passes payload 802 to layer 822, as depicted in diagram 800*b* (see FIG. 8B). Then layer 822 passes payload 802 to layer 824, as depicted in diagram 800*c* (see FIG. 8C).

Figure 8D:
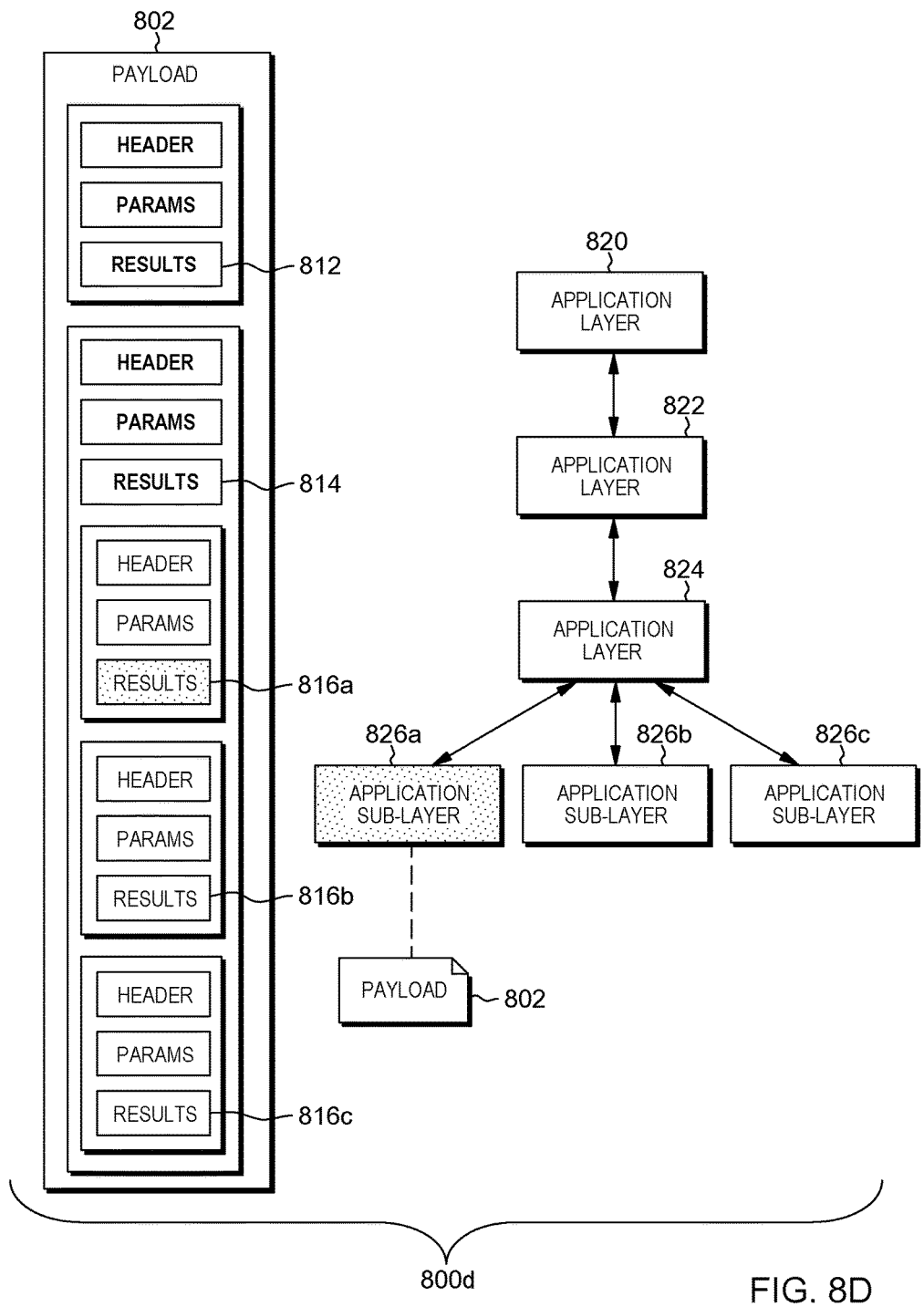
FIG. 8D is a diagram showing components of the third embodiment system, where the payload is located at a first application sub-layer of a fourth application layer, and where the results of the first application sub-layer of the fourth application layer have been returned in the payload.
Figure 8E:
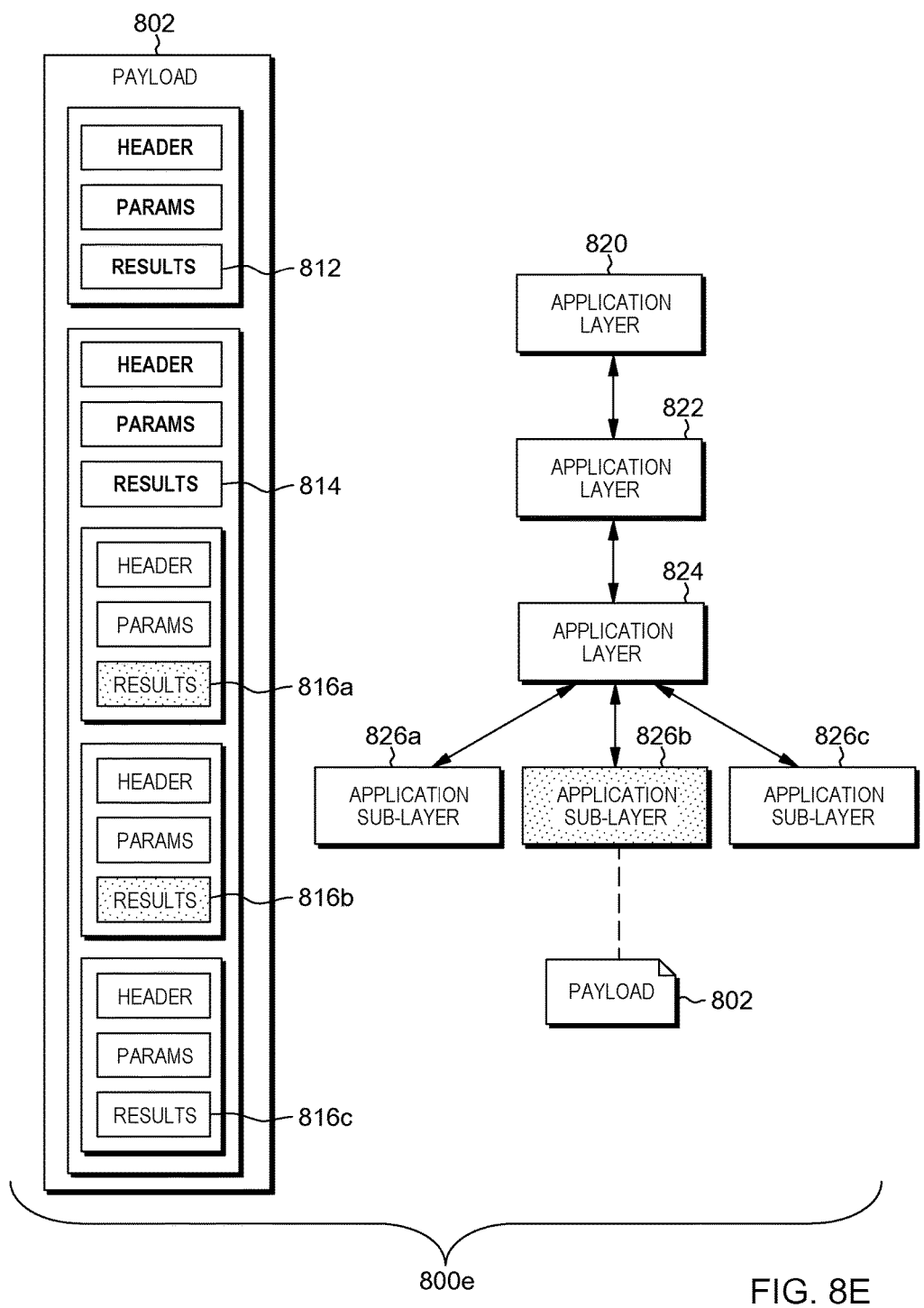
FIG. 8E is a diagram showing components of the third embodiment system, where the payload is located at a second application sub-layer of the fourth application layer, and where the results of the first application sub-layer and the second application sub-layer of the fourth application layer have been returned in the payload.
Figure 8F:
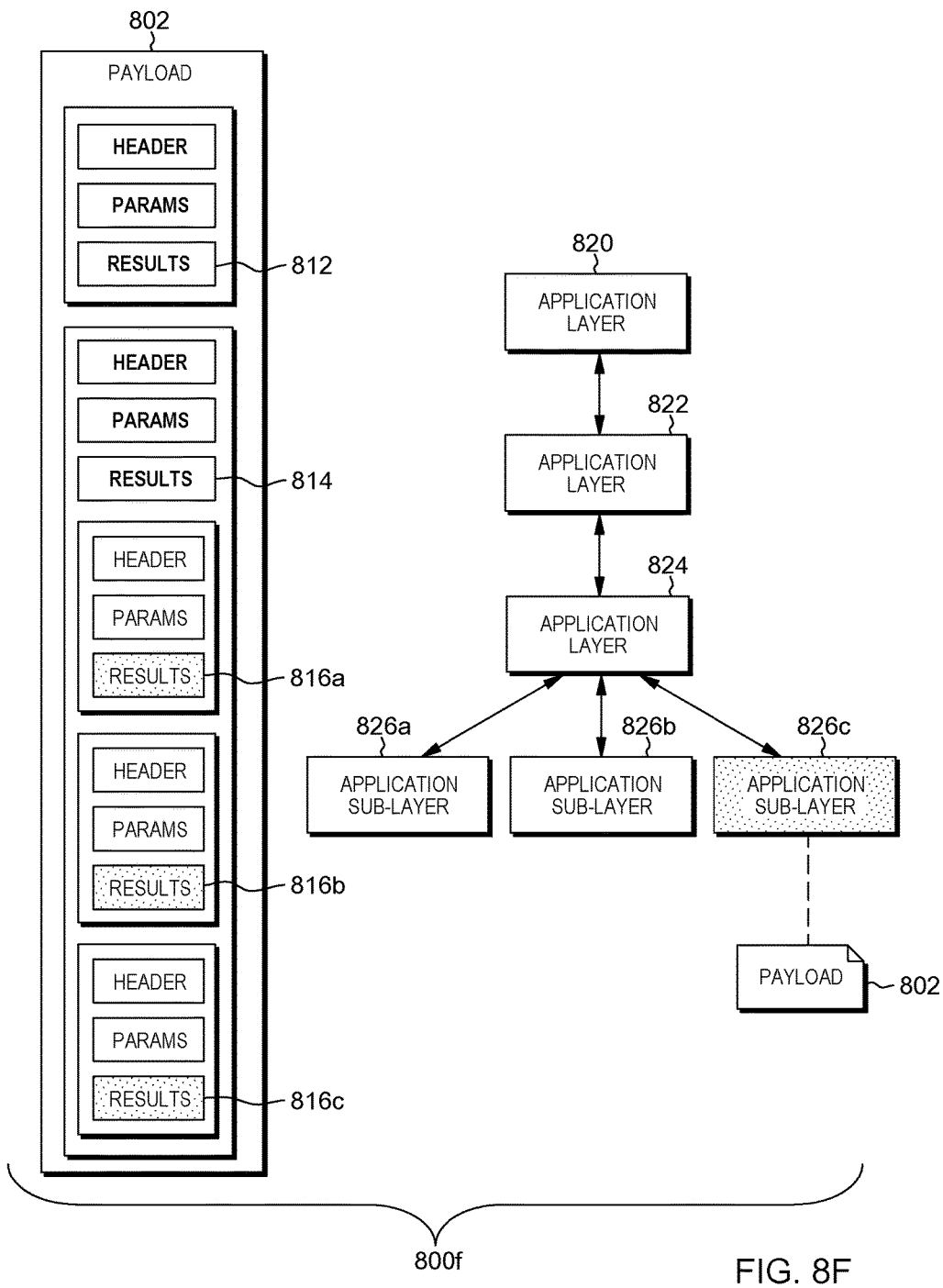
FIG. 8F is a diagram showing components of the third embodiment system, where the payload is located at a third application sub-layer of the fourth application layer, and where the results of the first application sub-layer, the second application sub-layer, and the third application sub-layer of the fourth application layer have been returned in the payload.

Once payload 802 is at application layer 824, layer 824 passes payload 802 to sub-layer 826*a* in order to perform a sub-operation, as depicted in diagram 800*d* (see FIG. 8D). Once sub-layer 826*a* completes the sub-operation, it appends the results of the sub-operation to results portion 816*a* of payload 802 (as shown in FIG. 8D) and sends payload 802 back to layer 824. Layer 824 then continues operation by passing payload 802 to sub-layer 826*b* in order to perform a second sub-operation, as depicted in diagram 800*e* (see FIG. 8E). Once sub-layer 826*b* completes the sub-operation, it appends the results of the sub-operation to results portion 816*b* of payload 802 (as shown in FIG. 8E) and sends payload 802 back to layer 824. Layer 824 then continues operation by passing payload 802 to sub-layer 826*c* in order to perform a third sub-operation, as depicted in diagram 800*f* (see FIG. 8F). Once sub-layer 826*c* completes the sub-operation, it appends the results of the sub-operation to results portion 816*c* of payload 802 (as shown in FIG. 8F) and sends payload 802 back to layer 824.

Figure 8G:
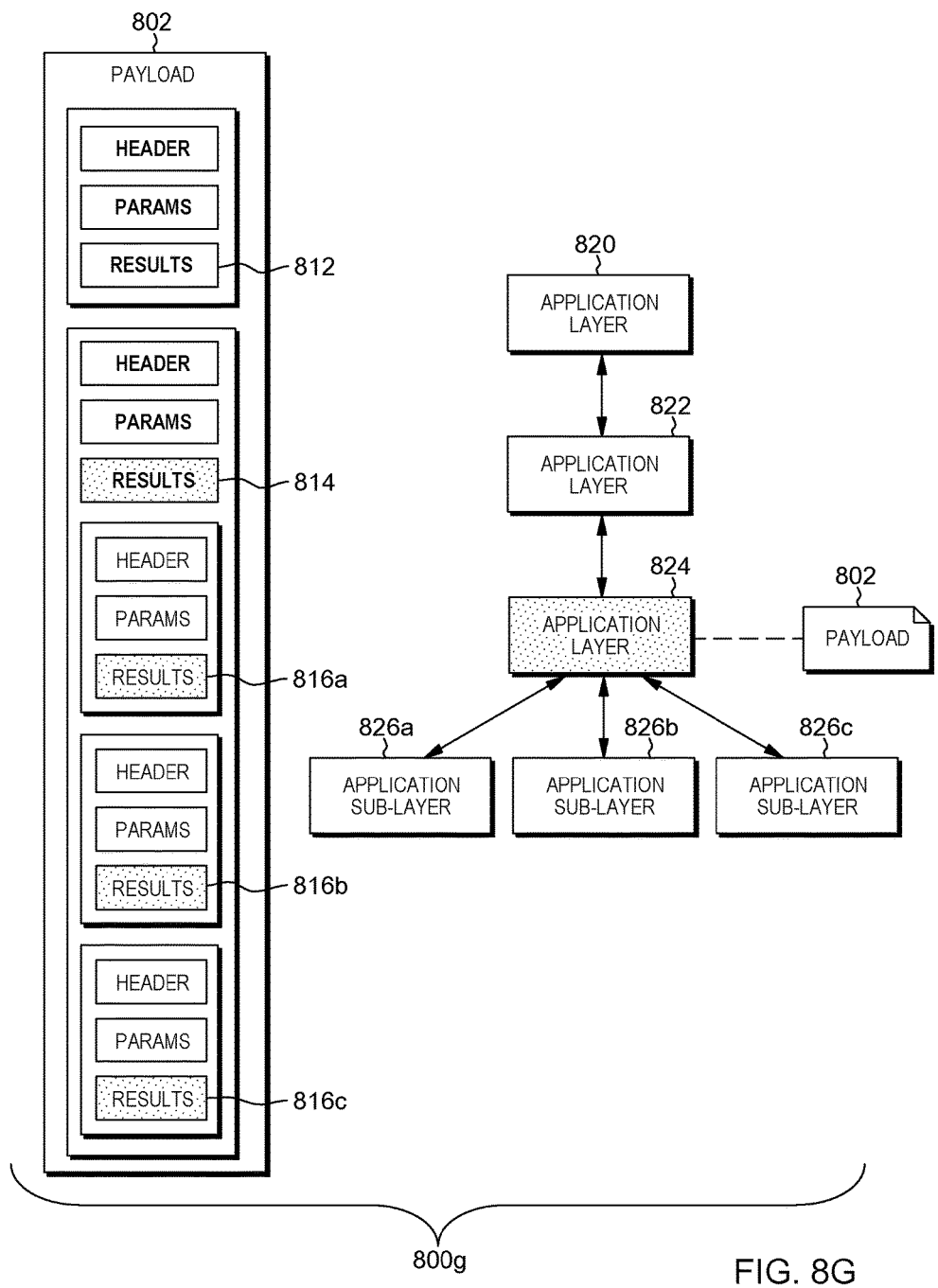
FIG. 8G is a diagram showing components of the third embodiment system, where the payload is located at the third application layer, and where the results of the fourth application layer and the third application layer have been returned in the payload.
Figure 8H:
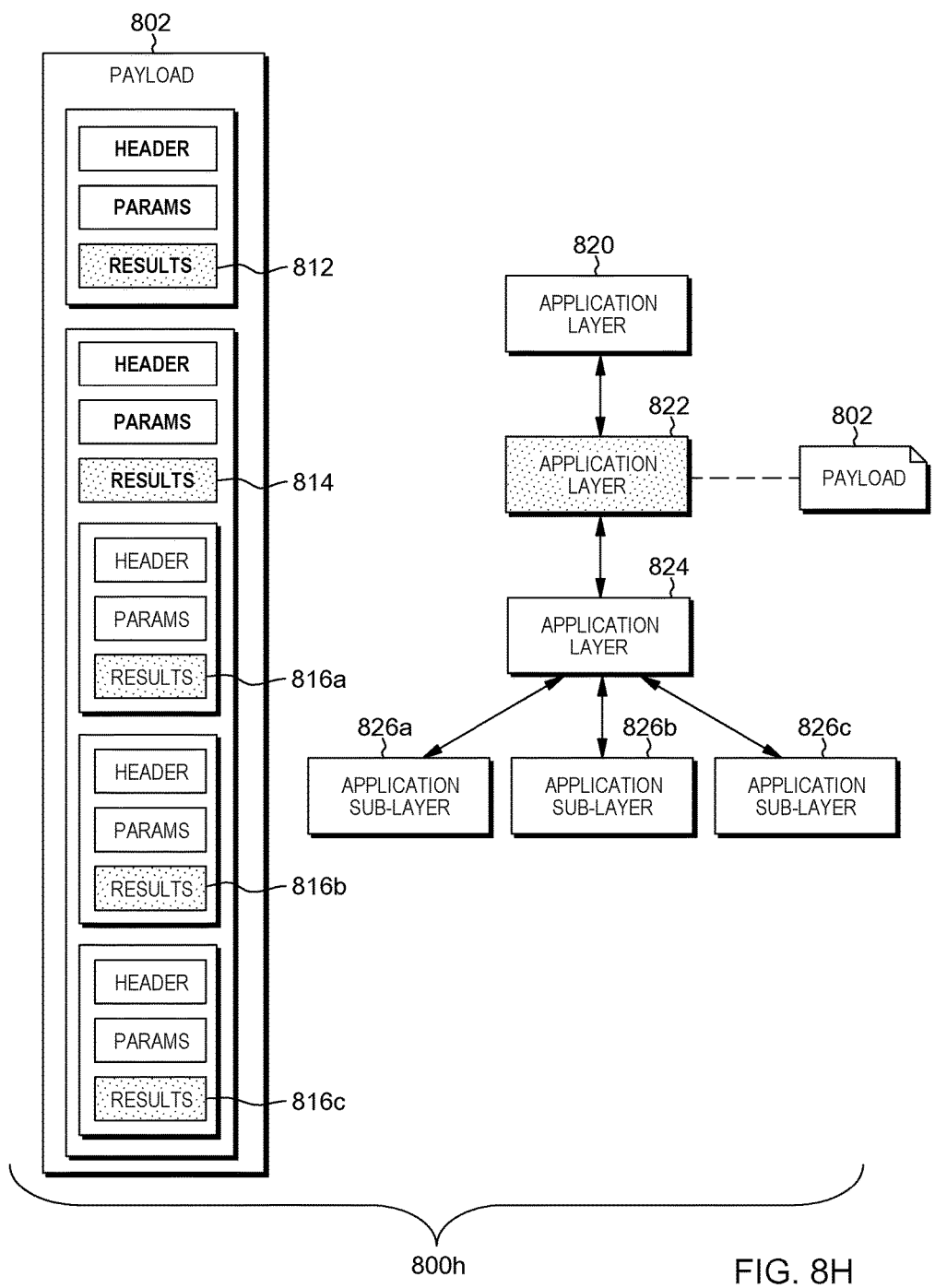
FIG. 8H is a diagram showing components of the third embodiment system, where the payload is located at the second application layer, and where the results of the fourth application layer, the third application layer, and the second application layer have been returned in the payload.
Figure 8I:
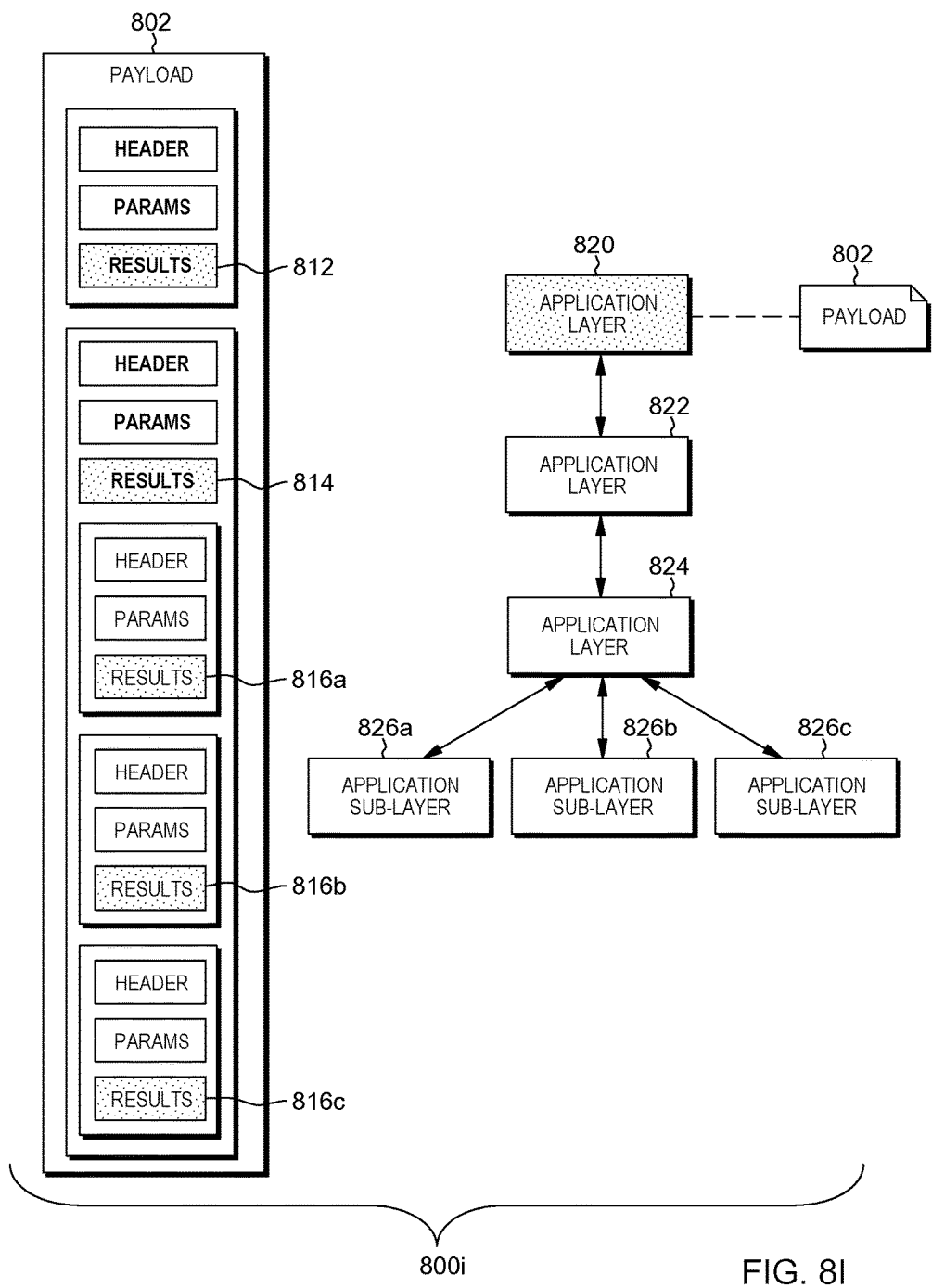
FIG. 8I is a diagram showing components of the third embodiment system, where the payload is located at the first application layer, and where the results of the fourth application layer, the third application layer, and the second application layer have been returned in the payload.

Once sub-layers 826*a*, 826*b*, and 826*c* have completed their sub-operations, layer 824 completes operation, appending its results to results portion 814 of payload 802 (as shown in FIG. 8G) and sends payload 802 back to layer 822. In turn, layer 822 completes operation, appending its results to results portion 812 of payload 802 (as shown in FIG. 8H) and sends payload 802 back to layer 820. Once payload 802 is back at layer 820 (see FIG. 8I), processing of payload 802 completes. The resulting payload 802 includes augmented information in results portions 812, 814, 816*a*, 816*b*, and 816*c*, and is ready to be used for audit purposes. Payload 802 can then be sent to a compliance service where the results will be consumed as evidence towards a compliance check.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Operation: any act performable by a computer, including, but not limited to: provisioning, operating system installation, software installation, software configuration, resource allocation, arithmetic (and/or other, more complex mathematical functions), natural language processing, monitoring, auditing, patching, backing up, social networking, analytics functions, arrangement, coordination, and/or management.

What is claimed is:

1. A method comprising:
   receiving, by one or more processors, an operation to perform across a multilayer cloud computing environment, wherein the multilayer cloud computing environment includes an application layer, a platform layer, and an infrastructure layer;
   generating, by one or more processors, a message for performing the operation across the multilayer cloud computing environment, wherein the message includes a plurality of layer portions that include sub-operation(s) of the operation, wherein each layer portion corresponds to a respective layer in the multilayer cloud computing environment, and wherein at least a first layer portion corresponding to a first layer in the multilayer cloud computing environment is nested within a second layer portion corresponding to a second layer in the multilayer cloud computing environment; and
   orchestrating, by one or more processors, performance of the operation by sending the message between layers in the multilayer cloud computing environment according to a sequence for performing sub-operation(s) indicated in the message, wherein when the message is located at a respective layer, the layer performs a respective set of sub-operation(s) according to the respectively corresponding layer portion for the layer in the message.

2. The method of claim 1, wherein each layer portion of the message is modifiable by the respectively corresponding layer for the layer portion in the multilayer cloud computing environment.

3. The method of claim 2, wherein at least one layer in the multilayer cloud computing environment modifies the respectively corresponding layer portion for the at least one layer by appending the results of the performance of the respective set of sub-operation(s) of the layer portion to the layer portion.

4. The method of claim 1, wherein the message further includes an orchestration plan indicating at least a first sending layer in the multilayer cloud computing environment and a first receiving layer in the multilayer cloud computing environment, wherein the first sending layer is to send the message to the first receiving layer according to the orchestration plan.

5. The method of claim 1, wherein each layer portion includes computer program instructions for performing the respective set of sub-operation(s) of the respective layer portion.

6. The method of claim 1, wherein each layer portion includes respective input parameter(s) for each sub-operation of the respective set of sub-operation(s) of the layer portion.

7. A computer program product comprising a computer readable storage medium having stored thereon:
   instructions executable by a device to cause the device to receive an operation to perform across a multilayer cloud computing environment, wherein the multilayer cloud computing environment includes an application layer, a platform layer, and an infrastructure layer;
   instructions executable by the device to cause the device to generate a message for performing the operation across the multilayer cloud computing environment, wherein the message includes a plurality of layer portions that include sub-operation(s) of the operation, wherein each layer portion corresponds to a respective layer in the multilayer cloud computing environment, and wherein at least a first layer portion corresponding to a first layer in the multilayer cloud computing environment is nested within a second layer portion corresponding to a second layer in the multilayer cloud computing environment; and
   instructions executable by the device to cause the device to orchestrate performance of the operation by sending the message between layers in the multilayer cloud computing environment according to a sequence for performing sub-operation(s) indicated in the message, wherein when the message is located at a respective layer, the layer performs a respective set of sub-operation(s) according to the respectively corresponding layer portion for the layer in the message.

8. The computer program product of claim 7, wherein each layer portion of the message is modifiable by the respectively corresponding layer for the layer portion in the multilayer cloud computing environment.

9. The computer program product of claim 8, wherein at least one layer in the multilayer cloud computing environment modifies the respectively corresponding layer portion for the at least one layer by appending the results of the performance of the respective set of sub-operation(s) of the layer portion to the layer portion.

10. The computer program product of claim 7, wherein the message further includes an orchestration plan indicating at least a first sending layer in the multilayer cloud computing environment and a first receiving layer in the multilayer cloud computing environment, wherein the first sending layer is to send the message to the first receiving layer according to the orchestration plan.

11. The computer program product of claim 7, wherein each layer portion includes computer program instructions for performing the respective set of sub-operation(s) of the respective layer portion.

12. The computer program product of claim 7, wherein each layer portion includes respective input parameter(s) for each sub-operation of the respective set of sub-operation(s) of the layer portion.

13. A computer system comprising:
a processor(s) set; and
a computer readable storage medium;
wherein:
the processor set is structured, located, connected and/or programmed to execute instructions stored on the computer readable storage medium; and
the instructions include:
instructions executable by a device to cause the device to receive an operation to perform across a multilayer cloud computing environment, wherein the multilayer cloud computing environment includes an application layer, a platform layer, and an infrastructure layer;
instructions executable by the device to cause the device to generate a message for performing the operation across the multilayer cloud computing environment, wherein the message includes a plurality of layer portions that include sub-operation(s) of the operation, wherein each layer portion corresponds to a respective layer in the multilayer cloud computing environment, and wherein at least a first layer portion corresponding to a first layer in the multilayer cloud computing environment is nested within a second layer portion corresponding to a second layer in the multilayer cloud computing environment; and
instructions executable by the device to cause the device to orchestrate performance of the operation by sending the message between layers in the multilayer cloud computing environment according to a sequence for performing sub-operation(s) indicated in the message, wherein when the message is located at a respective layer, the layer performs a respective set of sub-operation(s) according to the respectively corresponding layer portion for the layer in the message.

14. The computer system of claim 13, wherein each layer portion of the message is modifiable by the respectively corresponding layer for the layer portion in the multilayer cloud computing environment.

15. The computer system of claim 14, wherein at least one layer in the multilayer cloud computing environment modifies the respectively corresponding layer portion for the at least one layer by appending the results of the performance of the respective set of sub-operation(s) of the layer portion to the layer portion.

16. The computer system of claim 13, wherein the message further includes an orchestration plan indicating at least a first sending layer in the multilayer cloud computing environment and a first receiving layer in the multilayer cloud computing environment, wherein the first sending layer is to send the message to the first receiving layer according to the orchestration plan.

17. The computer system of claim 13, wherein each layer portion includes computer program instructions for performing the respective set of sub-operation(s) of the respective layer portion.

18. The computer system of claim 13, wherein each layer portion includes respective input parameter(s) for each sub-operation of the respective set of sub-operation(s) of the layer portion.

* * * * *